Nov. 1, 1966  L. H. BECKER ETAL  3,282,387
OVERLOAD CLUTCH
Filed Oct. 30, 1964
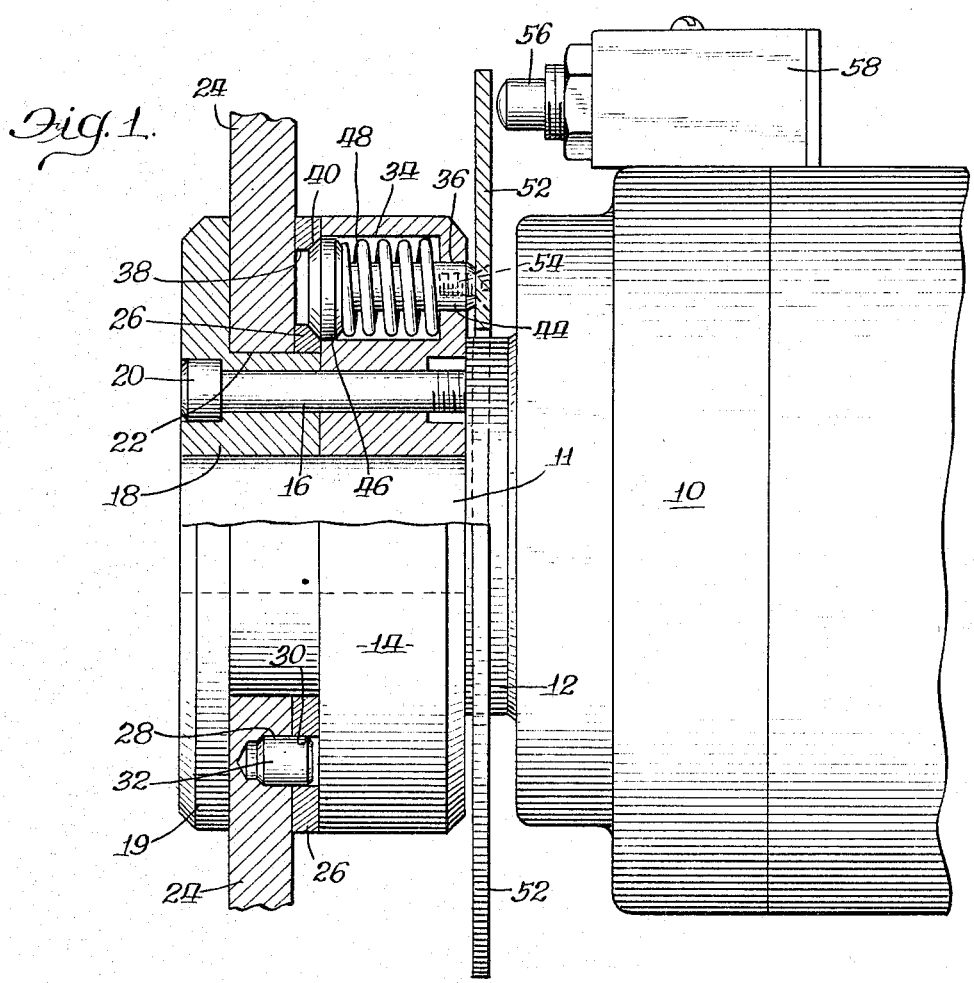
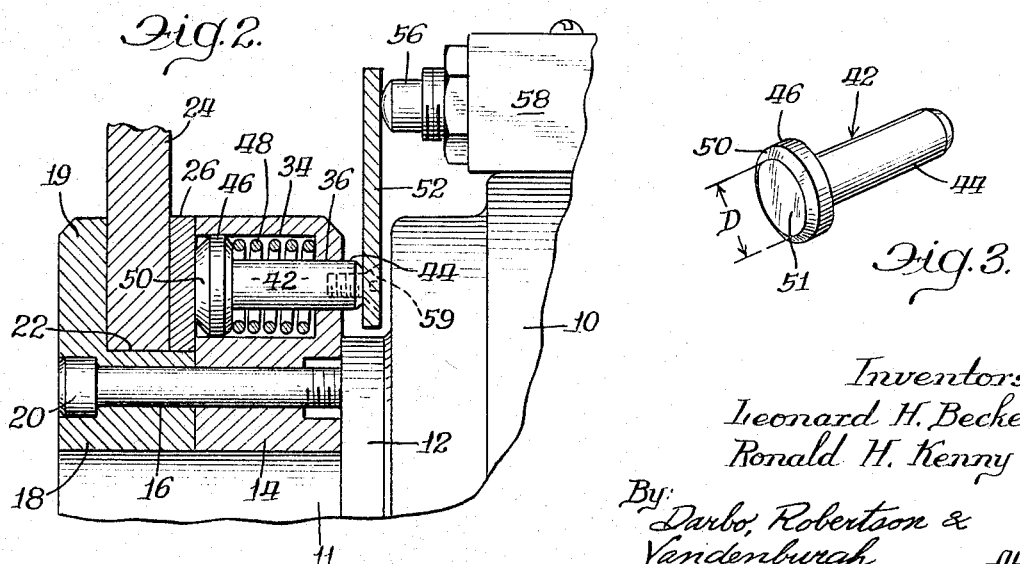
Inventors:
Leonard H. Becker
Ronald H. Kenny
By Darbo, Robertson & Vandenburgh
Attys 3,282,387
OVERLOAD CLUTCH
Leonard H. Becker, Country Club Hills, and Ronald H. Kenny, Addison, Ill., assignors to Commercial Cam & Machine Co., Chicago, Ill., a corporation of Illinois
Filed Oct. 30, 1964, Ser. No. 407,675
7 Claims. (Cl. 192—150)

This invention relates to an overload clutch of the detent type and the following disclosure thereof is offered for public dissemination upon the grant of a patent therefor.

Ball types of detents are commonly used in clutches but require a greater movement to release than does a tapered button end type of detent as employed in the present invention. Thus, embodiments of the present invention can be made substantially more compact for the same load rating than is possible with prior art clutches. A correlate is that within the same space limitations, greater spring preloads may be employed with embodiments of the present invention than can be achieved with a ball type detent. This results in a higher torque rating for the clutch.

Another important advantage achieved by embodiments of the present invention is decreased wear when the clutch is released. This of course results in increased clutch life. In the usual ball clutch, the ball is riding against the opposing clutch part when the clutch is released. The ball is held in this position, and is urged against this opposing part, by the release spring. The contact between the two is a point contact. All of the force provided by the compressed release spring is carried by this point contact. Even under ideal conditions this can result in considerable wear. In the present invention the contact is a substantial area, so that the pressure per unit of contact area is greatly diminished. This decreases clutch wear and increases clutch life.

In embodiments of the present invention the parts, and particularly the contact surfaces of the detent and its seat, need not be formed with that degree of accuracy required of a ball detent type clutch. With a ball, the angle of contact between the ball and its seat changes very rapidly with a change in the depth to which the ball is received in its seat. A seat contact angle correct for one depth of seating of a ball is entirely wrong for another depth of seating of the ball.

The detents of the present invention are directly loaded by a spring or the like. As compared to detents that are indirectly loaded by a spring, e.g. held in place by another detent which in turn is spring loaded, they are more readily calibrated in terms of torque required to produce clutch release. When calibrated, they are more accurate as to the torque required to cause clutch release, time after time.

It has been found that the seating angle of the detent is important in obtaining smooth clutch release, and little battering as the detents reseat upon each revolution of the clutch parts. The smooth clutch release action is one of the significant factors in producing embodiments wherein the clutch will release at a predetermined torque. Binding and frictional changes can affect the amount of torque required to cause clutch release with detent type clutches.

Further objects and advantages will be apparent from the following description taken in conjunction with the drawings, in which:

FIGURE 1 is an elevational view, partly in section, of an overload clutch mechanism, in accordance with this invention, in driving relation;

FIGURE 2 is a fragmentary view of the parts shown in FIGURE 1, in overload position; and FIGURE 3 is a perspective view of a plunger, as shown in the other figures with a flat and chamfered end button.

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose; as it is these that meet the requirement of pointing out the parts, improvements, or combinations in which the inventive concept are found.

Referring now more particularly to the drawings, a driver 10, which may be an electric motor, has a driving plate 12 secured to its output shaft 11. A plunger or detent carrying plate 14 is attached to driving plate 12 by a number of bolts 16. A driving cap 18 is also secured against the outside of the carrying plate 14 by the same bolts 16 extending through the cap 18 and plate 14. Bolts 16 have threads engaging in the plate 12, and heads 20 engaging the outside of the cap 18.

The periphery of the outer end of the cap 18 forms a flange 19 of the same diameter as that of the outside of the plunger plate 14. The inner end of cap 18 forms a shoulder 22 of reduced diameter. In the space between the plate 14 and the cap 18 and upon the shoulder 22 of the cap are mounted a driven member 24 and a wear plate 26. The driven member may be a gear, dial plate, sprocket or the like. The wear plate 26 and driven member 24 are secured together for joint operation by registering dowel openings 28 and 30 and dowel pins 32. Wear plate 26 has an inner diameter to fit on the reduced shoulder 22 of the cap and an outer diameter to the same as that of the plunger plate 14. The openings 30 of the wear plate are covered by the outer side of plunger plate 14.

In the corresponding outer portion of the plunger plate 14 are plunger or detent receiving openings 34 extending therethrough at right angles. These openings are open for the full size at the outer or wear plate side, but having a reduced opening 36 at the inner side. In the corresponding portions of the wear plate 26, and spaced from the dowel openings 30, are recesses to receive the detent or plunger heads 46. Each recess has a reduced portion 38 smaller in diameter than the adjacent plunger opening 34 and a chamfered connecting opening 40 increasing to the full size of plunger opening 34 at the inner side of the wear plate 26.

With this construction a plunger or detent 42 may be inserted in each plunger opening 34. Each plunger has a stem 44 and a button head 46. A portion of stem 44 extends through the reduced opening 36 and is guided therein. Head 46 is of the same size as the plunger opening 34 and is guided therein. Between head 46 and the abutment surrounding opening 36 opening 34 provides space surrounding the stem to receive a coiled spring 48 having one end bearing against the abutment about the reduced opening 36. The other end of the spring bears against head 46 thereby tending to press the button head toward the wear plate 26.

Button head 46 has an outer chamfered surface 50 being the frustum of a cone. The angle of chamfer corresponds to the surface about opening 40 in the wear plate 26. The diameter of the outer surface 51 of the head 46 determines the contact area between the detent and the wear plate 26 when the clutch is disengaged. The amount of wear by this contact will be a function of the spring pressure and this contact area (other conditions being equal). The spring pressure will be determined by the maximum torque which the clutch is to transmit before disengagement takes place. To produce a clutch with a satisfactory operating life the diameter of surface 51 should have at least a diameter as large as that determined by the following formula:

$$D=2\sqrt{\frac{P}{500\pi}}$$

Wherein:
$D$=The minimum diameter of the surface 51, and
$P$=the maximum spring force during an overload, in pounds.

The angle of chamfer of the detents is important to obtain a smooth operating clutch that will maintain engagement until the overload torque is reached and then the detents thereof will promptly and easily unseat. The chamfer forms the frustum of a cone. This cone should have an apex angle of between 70° and 100° to achieve the required smooth operation. In the illustrated embodiment the cone, of which the chamfered portion 50 is a part, has an apex angle of 90°.

The plungers 42 are connected by fastening screws 54 to a detector plate 52 positioned in the space surrounding the driving plate 12, between the motor or driver 10 and the plunger carrying plate 14. A snap action switch 58, e.g. a microswitch, is mounted so that its actuating plunger 56 will be operatively acted upon by detector plate 52 when the detents are unseated. This is illustrated in FIGURE 2. Under normal conditions, as shown in FIGURE 1, there is no contact between plate 52 and plunger 56. Switch 58 is employed to signal the existence of the overload causing clutch disengagement, such signal usually being in the form of deenergizing the drive motor.

The space between plate 52 and plunger 56 can be very small, much smaller than the lineal movement of the detents upon clutch disengagement. Thus a signal is quickly given, even before the clutch has fully disengaged. In a typical embodiment the detector plate rises 0.093 inch to completely disengage the clutch, but the limit switch signals or effects a power shut-off upon a movement of only .005 inch, i.e. substantially before the clutch is completely disengaged. When the overload condition is corrected and the detents are realigned with their seats, the springs 48 automatically return the plungers 42 to full engagement ready for normal operation.

It is significant that these features can be incorporated into an overload clutch which permits a parallel misalignment up to 1/64 of an inch and an angular misalignment up to 1/2 degree with zero backlash.

The plungers 42 are each guided at one end by stem 36 and at the other by head 46. This guidance at both ends gives a smooth action and eliminates binding. It also provides a central area for locating the spring in a manner that assures a minimum overall length and contributes to the compactness of the clutch.

We claim:

1. In an overload clutch, comprising a driver member, a driven member rotatable with respect thereto and a releasable connection between the members, the improvement comprising a plunger plate movable with the driver member and having transverse openings near the outer edge, said openings each having a first portion which is cylindrical through most of the plate and a second portion which is reduced in size at one side, plungers movable end wise in the transverse openings, each plunger having a button head at one end to slide in said first portion of said opening and a reduced stem in said second portion of said opening, thereby guiding the plunger at both ends, a wear plate secured to the driven member in juxtaposition to the other side of the plunger plate and having chamfered openings registering with the plunger openings, each plunger having a flat end at the outside of the button head with chamfered edges to register with one of said wear plate chamfered openings, and a coil spring surrounding the stem of each plunger in the first portion of the plunger opening and engaging the under side of the button head at one end and the wall of the plunger plate surrounding said second portion of the plunger opening at the other end.

2. In an overload clutch as set forth in claim 1, a cap having an outer flange of the same general external configuration as the outside of the plunger plate and with a reduced shoulder on the inner side of the cap forming a space with said first portion of the plunger opening of the plunger plate at one side, the driven member and the wear plate being mounted on said reduced shoulder and confined in between the cap flange and the plunger plate so the chamfered openings of the wear plate will engage the chamfered end of the corresponding plunger, and means engaging the driven member and the wear plate for holding them together in driving relation.

3. In an overload clutch as set forth in claim 1, wherein the flat end of the button head is circular and has a minimum diameter determined by the formula: the minimum diameter in inches equals two multiplied by the square root of the spring pressure in pounds divided by five hundred pi.

4. In an overload clutch as set forth in claim 1, wherein said button head is cylindrical and the chamfered edges thereof form a frustum of a cone having an apex angle of between 70° and 100°.

5. An overload clutch as set forth in claim 1 in which each plunger is longer than the thickness of the plunger plate to engage the wear plate at the head end and the stem projecting from the plate at its opposite side, a detector plate at said one side of the plunger plate, mounting means connecting the detector plate to the clutch in a position to contact the stem end of a plunger, the detector plate being axially movable with said plunger, and an electrical limit switch having an actuating means engaged by the detector plate in its longitudinal movement to actuate said switch to initiate a signal for indicating the overload.

6. In an overload clutch of the detent type wherein a plurality of detents carried by one member normally seat in recesses in another member and are unseated by an overload to permit the other member to rotate with respect to said one member, the improvement comprising: said one member having a detent receiving opening for each detent, each opening being a large cylinder at the side of the one member adjacent the other member, said one member having a wall at the other side thereof with a small opening therethrough, said small opening being coaxial with the large opening, each detent having a button head slideably received in the large opening and a stem slideably received in the small opening, said button head having a flat, circular, end opposite said stem and chamfered edges about said end, said recess having chamfered sides, said chamfered edges and sides being a frustum of a cone having an apex angle of between 70° and 100°, a coil spring in said large opening and about said stem with one end thereof abutting said wall and the other end thereof abutting said head, said spring urging said head into said recess with a force of a magnitude sufficient to hold said head seated in said recess until a given torque is applied between the members, said flat end having a minimum diameter determined by the formula: the minimum diameter in inches equals two multiplied by the square root of the spring force in pounds divided by five hundred pi.

7. In a clutch as set forth in claim 6, including a detector plate positioned at said other side of the one member, secured to the stems of the detents and moveable therewith, stationary switch means, and actuating means operatively interconnecting said switch means and said plate to actuate said switch means by movement of the plate resulting from the detents becoming at least partially unseated from said recesses.

References Cited by the Examiner

UNITED STATES PATENTS

| | | | |
|---|---|---|---|
| 2,148,481 | 2/1939 | Le Frank | 192—56 |
| 2,167,749 | 8/1939 | Grohn | 192—56 |
| 2,209,155 | 7/1940 | Fagg. | |
| 2,232,545 | 2/1941 | Lum | 192—150 X |
| 2,856,046 | 10/1958 | Bofinger | 192—150 X |

DAVID J. WILLIAMOWSKY, *Primary Examiner.*

A. T. McKEON, *Assistant Examiner.*